US009485102B2

(12) United States Patent
Walker et al.

(10) Patent No.: US 9,485,102 B2
(45) Date of Patent: Nov. 1, 2016

(54) TECHNIQUES FOR USER-VALIDATED CLOSE-RANGE MUTUAL AUTHENTICATION

(75) Inventors: Jesse Walker, Portland, OR (US); Michelle X. Gong, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 998 days.

(21) Appl. No.: 13/534,652

(22) Filed: Jun. 27, 2012

(65) Prior Publication Data
US 2014/0006784 A1    Jan. 2, 2014

(51) Int. Cl.
*H04W 12/06* (2009.01)
*H04L 9/32* (2006.01)
*H04W 12/04* (2009.01)
*H04W 12/10* (2009.01)

(52) U.S. Cl.
CPC .......... *H04L 9/3273* (2013.01); *H04W 12/04* (2013.01); *H04W 12/06* (2013.01); *H04W 12/10* (2013.01); *H04L 2209/64* (2013.01); *H04L 2209/805* (2013.01)

(58) Field of Classification Search
CPC .......... H04W 12/06; H04L 2209/805; H04L 2209/64
USPC ...................................................... 713/169
See application file for complete search history.

(56) References Cited

U.S. PATENT DOCUMENTS

| 6,105,012 | A | 8/2000 | Chang et al. |
| 6,496,932 | B1 | 12/2002 | Trieger |
| 7,774,362 | B2 | 8/2010 | Dong |
| 7,948,925 | B2 | 5/2011 | Miyabayashi et al. |
| 8,181,234 | B2 | 5/2012 | Ishida |
| 2006/0240778 | A1* | 10/2006 | Yuki et al. ................ 455/41.2 |
| 2007/0198633 | A1* | 8/2007 | Thibeault .................... 709/203 |
| 2009/0055642 | A1* | 2/2009 | Myers et al. ............... 713/155 |
| 2010/0262829 | A1 | 10/2010 | Brown et al. |
| 2010/0275010 | A1 | 10/2010 | Ghirardi |
| 2011/0081860 | A1 | 4/2011 | Brown et al. |

(Continued)

OTHER PUBLICATIONS

International Search Report and Written Opinion received for PCT Patent Application No. PCT/US2013/046013, mailed Sep. 26, 2013, 17 pages.

(Continued)

*Primary Examiner* — Ellen Tran

(57) ABSTRACT

A close-range mutual authentication system is described. A method may comprise receiving encoded connection information at a close-range input device of a client mode electronic device from a server mode electronic device; decoding the encoded connection information into one or more connection elements; establishing a communication connection with the server mode electronic device utilizing the connection elements; receiving authentication information at the client mode electronic device via the communication connection; authenticating the server mode electronic device to the client mode electronic device utilizing the authentication information; and generating one or more authentication elements responsive to authentication of the server mode electronic device for presentation via a close-range output device of the client mode electronic device, the one or more authentication elements configured to confirm authentication of the client mode electronic device to the server mode electronic device. Other embodiments are described and claimed.

28 Claims, 7 Drawing Sheets

(56) References Cited

U.S. PATENT DOCUMENTS

2011/0202988 A1   8/2011   Otranen et al.
2011/0210171 A1   9/2011   Brown et al.

OTHER PUBLICATIONS

McCune, et al., "Seeing-Is-Believing:Using Camera Phones for Human-Veritable Authentication",Carnegie Mellon University, Aug. 2004.

Haller et al., "A One-Time Password System", Network Working Group, The Internet Society (1998).
Extended European Search Report received for European Patent Application No. 13809228.3, mailed Jan. 22, 2016, 9 pages.
Office Action and Search Report received for Chinese Patent Application No. 201380027917.4, mailed Jun. 14, 2016, 3 pages, (untranslated).
McClune et al., "Seeing is Believing: Using Camera Phones for Human-Verifiable Authentication", IEEE Symposium on Security and Privacy, 2005, 46 pages.

* cited by examiner

600

- GENERATE ENCODED CONNECTION INFORMATION AT A CLOSE-RANGE OUTPUT DEVICE OF A SERVER MODE ELECTRONIC DEVICE
  602

- TRANSMIT AUTHENTICATION MESSAGES COMPRISING AUTHENTICATION INFORMATION ASSOCIATED WITH THE SERVER MODE ELECTRONIC DEVICE TO A CLIENT MODE ELECTRONIC DEVICE
  604

- RECEIVE AUTHENTICATION MESSAGES CONFIRMING AUTHENTICATION OF THE SERVER MODE ELECTRONIC DEVICE AT THE CLIENT MODE ELECTRONIC DEVICE
  606

- GENERATE ONE OR MORE HUMAN-READABLE AUTHENTICATION ELEMENTS FOR PRESENTATION ON A DISPLAY OF THE SERVER MODE ELECTRONIC DEVICE, THE ONE OR MORE HUMAN-READABLE AUTHENTICATION ELEMENTS CONFIGURED TO AUTHENTICATE THE CLIENT MODE ELECTRONIC DEVICE TO THE SERVER MODE ELECTRONIC DEVICE
  608

- AUTHENTICATE THE CLIENT MODE ELECTRONIC DEVICE TO THE SERVER MODE ELECTRONIC DEVICE RESPONSIVE TO RECEIVING VERIFIED AUTHENTICATION INPUT INDICATING VERIFICATION OF THE HUMAN-READABLE AUTHENTICATION ELEMENTS
  610

*FIG. 6*

TECHNIQUES FOR USER-VALIDATED CLOSE-RANGE MUTUAL AUTHENTICATION

BACKGROUND

Initial trust establishment between computing devices is a fundamental challenge in cryptography. In general, trust establishment involves authenticating the identities of devices that have never been connected in a pre-existing secure environment. Complex security and cryptography solutions have been employed by skilled individuals, for example, an Information Technology (IT) administrator, in sophisticated environments, such as a corporate computing architecture. However, manageable authentication methods for the general public are essentially missing from the consumer electronic device domain, for instance, for establishing a secure connection between a smart phone and a tablet computing device, two smart phones, or a laptop and a personal digital assistant (PDA). Although developers have attempted to provide security protocols for the general public, including Wi-Fi Protected Setup and Bluetooth pairing, they have essentially proven unreliable and prone to security defects. Thus, as consumer electronic devices, such as mobile computing form factors, have increased in processing power and functionality, a straightforward and effective protocol for securely connecting these devices remains elusive.

It is with respect to these and other considerations that the present improvements have been needed.

BRIEF DESCRIPTION OF THE DRAWINGS

FIG. 6 illustrates an embodiment of a second logic flow.

DETAILED DESCRIPTION

Figure 1:
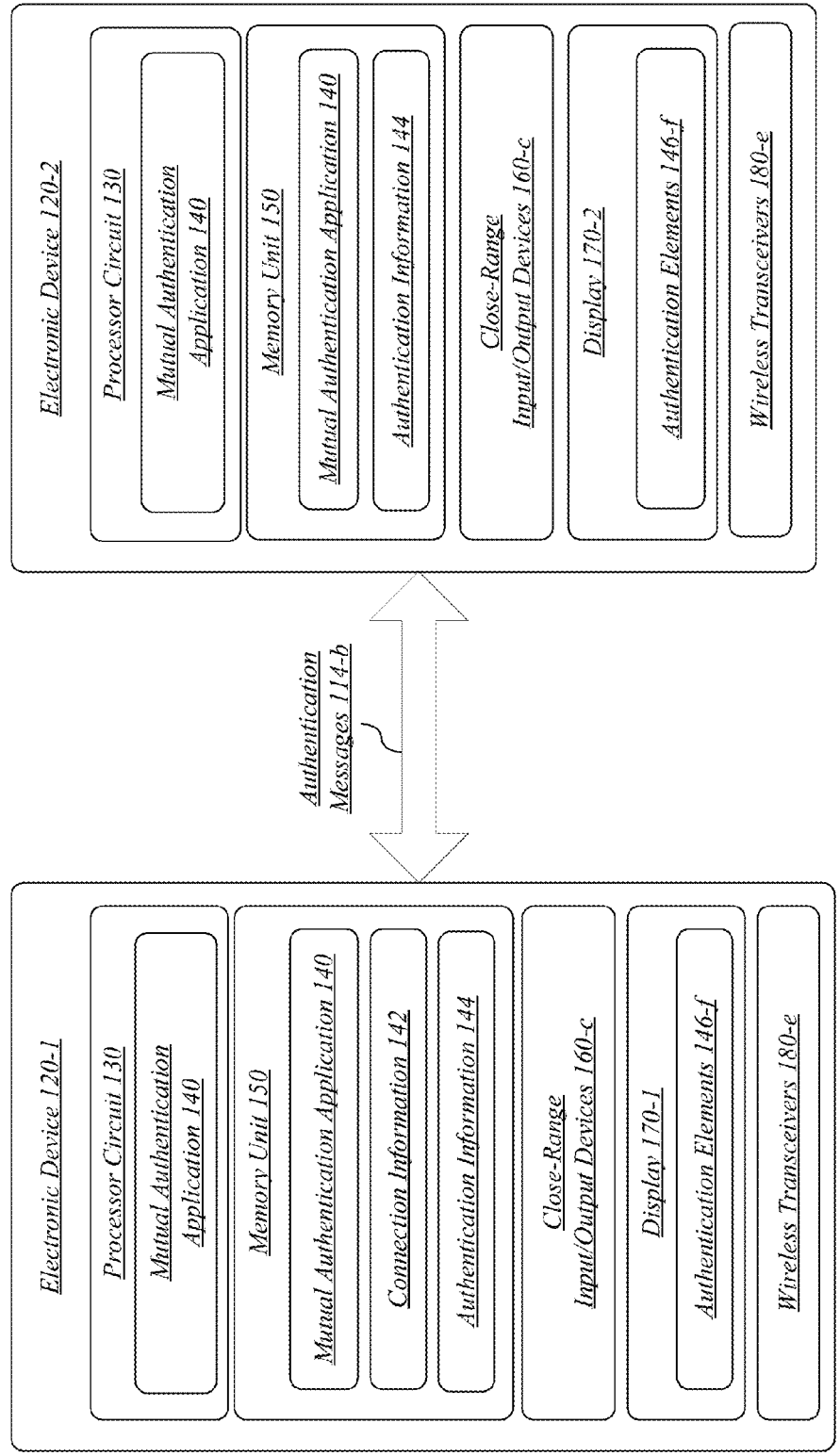
FIG. 1 illustrates an embodiment of a close-range mutual authentication system.

Various embodiments are generally directed to techniques for the authentication of electronic devices. Some embodiments are particularly directed to authentication of proximate electronic devices utilizing visual, demonstrative identification of one or more of the electronic devices. The devices may establish a connection utilizing authentication information accessed through a close-range input device, such as a camera or a near-field communication (NFC) reader. Messages may be exchanged between the devices through the connection, such as a wireless communication connection. The messages may contain security information and device identification information for device authentication. According to certain embodiments, authentication may further comprise demonstrative identification of the devices through human-readable verification elements. These authentication techniques operate to significantly increase the reliability and simplicity of electronic device authentication, thereby enhancing user productivity, convenience, and experience.

With general reference to notations and nomenclature used herein, the detailed description which follows may be presented in terms of program procedures executed on a computer or network of computers. These procedural descriptions and representations are used by those skilled in the art to most effectively convey the substance of their work to others skilled in the art.

A procedure is here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

As used hereinafter, "a" and "b" and "c" and similar designators as used herein are intended to be variables representing any positive integer. Thus, for example, if an implementation sets a value for a=5, then a complete set of electronic devices 120-a may include electronic devices 120-1, 120-2, 120-3, 120-4 and 120-5. In some embodiments, the complete set of electronic devices 120-1, 120-2, 120-3, 120-4 and 120-5 may include five different electronic devices, five different types of a same electronic device, five specific electronic devices 120 or any other suitable convention. The embodiments are not limited in this context.

FIG. 1 illustrates a block diagram for a close-range mutual authentication system 100. In one embodiment, the close-range mutual authentication system 100 may comprise a computer-based system comprising an electronic device 120-a. The electronic device 120-a may comprise, for example, a processor circuit 130, a memory unit 150, close-range input/output devices 160-c, displays 170-d, and one or more transceivers 180-e. The electronic device 120-a may further have comprise a mutual authentication application 140. The memory unit 150 may store an unexecuted version of the mutual authentication application 140, connection information 142, and authentication information 144. Although the close-range mutual authentication system 100 shown in FIG. 1 has a limited number of elements in a certain topology, it may be appreciated that the close-range mutual authentication system 100 may include more or fewer elements in alternate topologies as desired for a given implementation.

In various embodiments, the close-range mutual authentication system 100 may comprise two or more electronic devices 120-a, such as electronic devices 120-1, 120-2. Some examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, machine, or combination thereof. The embodiments are not limited in this context.

In one embodiment, for example, the electronic device 120-1 may be implemented as a desktop computer having wireless communications capabilities. The electronic device 120-2 may be implemented as a mobile device having a portable power supply and wireless communications capabilities, such as a laptop computer, handheld computer, tablet computer, smart phone, gaming device, consumer electronic, or other mobile device. The embodiments are not limited to these examples, however, and any pair of electronic devices 120-1, 120-2 may be used as desired for a given implementation. Further, although the electronic devices 120-1, 120-2 are shown in FIG. 1 as homogeneous devices having similar device elements, it may be appreciated that the electronic devices 120-1, 120-2 may comprise heterogeneous devices having different device elements. The embodiments are not limited in this context.

In various embodiments, the close-range mutual authentication system 100 may comprise a processor circuit 130. The processor circuit 130 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core (2) Quad®, Core i3®, Core i5®, Core i7®, Atom®, Itanium®, Pentium®, Xeon®, and XScale® processors; and similar processors. Dual microprocessors, multi-core processors, and other multi-processor architectures may also be employed as the processing circuit 130.

In various embodiments, the close-range mutual authentication system 100 may comprise a memory unit 150. The memory unit 150 may store, among other types of information, the mutual authentication application 140 and connection information 142. The memory unit 150 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Connection information 142 may comprise any electronic information capable of storing information associated with establishing a connection with an electronic device 120-a. For example, the connection information 142 may include, without limitation, a TCP port number and an IP address. In one embodiment, the connection information 142 may further comprise one or more security elements, such as a certificate, including a self-signed certificate, a random number, a hash value, or some combination thereof. According to certain embodiments, the connection information 142 may be encoded such that an electronic device 120-a receiving the connection information 142 may be required to decode the connection information 142 in order to utilize any information contained therein. In another embodiment, the connection information 142 may be encoded into one or more forms conducive to access by a close-range input/output device 160-c. For instance, the connection information 142 may be encoded into a quick response (QR) code, bar code, graphic, or electronic file which may be accessed by a camera, QR reader, bar code reader, or NFC reader.

Authentication information 144 may comprise any electronic information capable of storing information associated with an electronic device 120-a. According to certain embodiments, the authentication information 144 may be utilized by electronic devices 120-a to identify or authenticate another electronic device 120-a. For example, authentication information 144 may comprise digital certificates, random numbers, hash values, public and/or private encryption keys, signatures, security elements, and combinations thereof. The authentication information 144 may be generated by an electronic device 120-a without outside information, such as a self-signed digital certificate, or utilizing information obtained from another electronic device 120-a. For instance, electronic device 120-2 may receive a hash value from electronic device 120-1, and may generate an encryption key utilizing the hash value.

In various embodiments, the close-range mutual authentication system 100 may comprise one or more close-range input/output devices. The close-range input/output devices 160-c may operate to obtain information from proximate electronic devices 120-a. Non-limiting examples of close-range input/output devices 160-c include a camera, QR reader/writer, bar code reader, and a display 170-d coupled with an electronic device 120-a. For instance, the close-range input/output devices 160-c may receive input from another electronic device 120-a if the close-range input/output devices 160-c touch (e.g., NFC reader), observe (e.g., camera, QR reader, bar code reader), or are within a specified distance (e.g., proximity of less than three feet). In this manner, the close-range mutual authentication system 100 may achieve one layer of security for device authentication because authentication may not be initiated unless the electronic devices 120-a are physically accessible to each other. In addition, for mobile computing devices, such as smart phones, authentication may be facilitated in that users desiring to share information on their mobile devices may initiate the process simply by arranging their devices proximate to each other and exchanging initial connection information.

The electronic devices 120-1, 120-2 may each implement a display 170-d. The display 170-d may comprise any digital display device suitable for the electronic devices 120-1, 120-2. For instance, the displays 170-d may be implemented by a liquid crystal display (LCD) such as a touch-sensitive, color, thin-film transistor (TFT) LCD, a plasma display, a light emitting diode (LED) display, an organic light emitting diode (OLED) display, a cathode ray tube (CRT) display, or other type of suitable visual interface for displaying content to a user of the electronic devices 120-1, 120-2. The displays 170-d may further include some form of a backlight or brightness emitter as desired for a given implementation.

The electronic devices 120-1, 120-2 may each implement one or more wireless transceivers 180-e. Each of the wireless transceivers 180-e may be implemented as physical wireless adapters or virtual wireless adapters, sometimes referred to as "hardware radios" and "software radios." In the latter case, a single physical wireless adapter may be virtualized using software into multiple virtual wireless adapters. A physical wireless adapter typically connects to a hardware-based wireless access point. A virtual wireless adapter typically connects to a software-based wireless access point, sometimes referred to as a "SoftAP." For instance, a virtual wireless adapter may allow ad hoc communications between peer devices, such as a smart phone and a desktop computer or notebook computer. Various embodiments may use a single physical wireless adapter implemented as multiple virtual wireless adapters, multiple physical wireless adapters, multiple physical wireless adapters each implemented as multiple virtual wireless adapters, or some combination thereof. The embodiments are not limited in this case.

The wireless transceivers 180-e may comprise or implement various communication techniques to allow the electronic devices 120-1, 120-2 to communicate with other electronic devices. For instance, the wireless transceivers 180-e may implement various types of standard communication elements designed to be interoperable with a network, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

In various embodiments, the electronic devices 120-a may implement different types of wireless transceivers 180-e. Each of the wireless transceivers 180-e may implement or utilize a same or different set of communication parameters to communicate information between various electronic devices. In one embodiment, for example, each of the wireless transceivers 180-e may implement or utilize a different set of communication parameters to communicate information between the electronic device 120-a and a remote device. Some examples of communication parameters may include without limitation a communication protocol, a communication standard, a radio-frequency (RF) band, a radio, a transmitter/receiver (transceiver), a radio processor, a baseband processor, a network scanning threshold parameter, a radio-frequency channel parameter, an access point parameter, a rate selection parameter, a frame size parameter, an aggregation size parameter, a packet retry limit parameter, a protocol parameter, a radio parameter, modulation and coding scheme (MCS), acknowledgement parameter, media access control (MAC) layer parameter, physical (PHY) layer parameter, and any other communication parameters affecting operations for the wireless transceivers 180-e. The embodiments are not limited in this context.

In various embodiments, the wireless transceivers 180-e may implement different communication parameters offering varying bandwidths, communications speeds, or transmission range. For instance, a first wireless transceiver 180-1 may comprise a short-range interface implementing suitable communication parameters for shorter range communications of information, while a second wireless transceiver 180-2 may comprise a long-range interface implementing suitable communication parameters for longer range communications of information.

In various embodiments, the terms "short-range" and "long-range" may be relative terms referring to associated communications ranges (or distances) for associated wireless transceivers 180-e as compared to each other rather than an objective standard. In one embodiment, for example, the term "short-range" may refer to a communications range or distance for the first wireless transceiver 180-1 that is shorter than a communications range or distance for another wireless transceiver 180-e implemented for the electronic device 120-a, such as a second wireless transceiver 180-2. Similarly, the term "long-range" may refer to a communications range or distance for the second wireless transceiver 180-2 that is longer than a communications range or distance for another wireless transceiver 180-e implemented for the electronic device 120-a, such as the first wireless transceiver 180-1. The embodiments are not limited in this context.

In various embodiments, the terms "short-range" and "long-range" may be relative terms referring to associated communications ranges (or distances) for associated wireless transceivers 180-e as compared to an objective measure, such as provided by a communications standard, protocol or interface. In one embodiment, for example, the term "short-range" may refer to a communications range or distance for the first wireless transceiver 180-1 that is shorter than 300 meters or some other defined distance. Similarly, the term "long-range" may refer to a communications range or distance for the second wireless transceiver 180-2 that is longer than 300 meters or some other defined distance. The embodiments are not limited in this context.

In one embodiment, for example, the wireless transceiver 180-1 may comprise a radio designed to communicate information over a wireless personal area network (WPAN) or a wireless local area network (WLAN). The wireless transceiver 180-1 may be arranged to provide data communications functionality in accordance with different types of lower range wireless network systems or protocols. Examples of suitable WPAN systems offering lower range data communication services may include a Bluetooth system as defined by the Bluetooth Special Interest Group, an infra-red (IR) system, an Institute of Electrical and Electronics Engineers (IEEE) 802.15 system, a DASH7 system, wireless universal serial bus (USB), wireless high-definition (HD), an ultra-side band (UWB) system, and similar systems. Examples of suitable WLAN systems offering lower range data communications services may include the IEEE 802.xx series of protocols, such as the IEEE 802.11a/b/g/n series of standard protocols and variants (also referred to as "WiFi"). It may be appreciated that other wireless techniques may be implemented, and the embodiments are not limited in this context.

In one embodiment, for example, the wireless transceiver 180-2 may comprise a radio designed to communicate information over a wireless local area network (WLAN), a wireless metropolitan area network (WMAN), a wireless wide area network (WWAN), or a cellular radiotelephone system. The wireless transceiver 180-2 may be arranged to provide data communications functionality in accordance with different types of longer range wireless network systems or protocols. Examples of suitable wireless network systems offering longer range data communication services may include the IEEE 802.xx series of protocols, such as the IEEE 802.11a/b/g/n series of standard protocols and variants, the IEEE 802.16 series of standard protocols and variants, the IEEE 802.20 series of standard protocols and variants (also referred to as "Mobile Broadband Wireless Access"), and so forth. Alternatively, the wireless transceiver 180-2 may comprise a radio designed to communication information across data networking links provided by one or more cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and similar systems. It may be appreciated that other wireless techniques may be implemented, and the embodiments are not limited in this context.

Although not shown, the electronic device 120-a may further comprise one or more device resources commonly implemented for electronic devices, such as various computing and communications platform hardware and software components typically implemented by a personal electronic device. Some examples of device resources may include without limitation a co-processor, a graphics processing unit (GPU), a chipset/platform control hub (PCH), an input/output (I/O) device, computer-readable media, display electronics, display backlight, network interfaces, location devices (e.g., a GPS receiver), sensors (e.g., biometric, thermal, environmental, proximity, accelerometers, barometric, pressure, etc.), portable power supplies (e.g., a battery), application programs, system programs, and so forth. Other examples of device resources are described with reference to exemplary computing architectures shown by FIG. 7. The embodiments, however, are not limited to these examples.

In the illustrated embodiment shown in FIG. 1, the processor circuit 130 may be communicatively coupled to the wireless transceivers 180-e and the memory unit 150. The memory unit 150 may store a mutual authentication application 140 arranged for execution by the processor circuit 130 to authenticate electronic devices 120-a. The mutual authentication application 140 may generally provide features to securely authenticate electronic devices 120-a in proximity to each other utilizing out-of-band communications. More particularly, the mutual authentication application 140 may allow a user of an electronic device 120-2 to access connection information 142 for connecting to electronic device 120-1 utilizing a close-range input/output device 160-c, and to exchange authentication messages 114-b containing authentication information 144 for authenticating to the electronic device 120-1. Responsive to the electronic device 120-1 authenticating to the electronic device 120-2, one or more authentication elements 146-f may be presented on a display 170-1, 170-2 coupled to the electronic device 120-1, electronic device 120-2, or both. Users of electronic devices 120-1, 120-2 may access the authentication elements 146-f and may indicate validation of the authentication to the electronic device 120-1, 120-2. In this manner, electronic device 120-2 may be authenticated to electronic device 120-1. In one embodiment, the authentication elements 146-f may be human-readable, such as words, pictures, numbers, or combinations thereof.

When the mutual authentication application is active on the electronic devices 120-1, 120-2, the electronic device 120-1 may be referred to as being in a "server mode" and the electronic device 120-2 may be referred to as being in a "client mode." The terms "server mode" and "client mode" are for reference purposes and do not necessarily represent a server-client relationship between electronic devices 120-1, 120-2 as known to those having ordinary skill in the art.

Particular aspects, embodiments and alternatives of the close-range mutual authentication system 100 and the mutual authentication application 140 may be further described with reference to FIG. 2.

Figure 2:
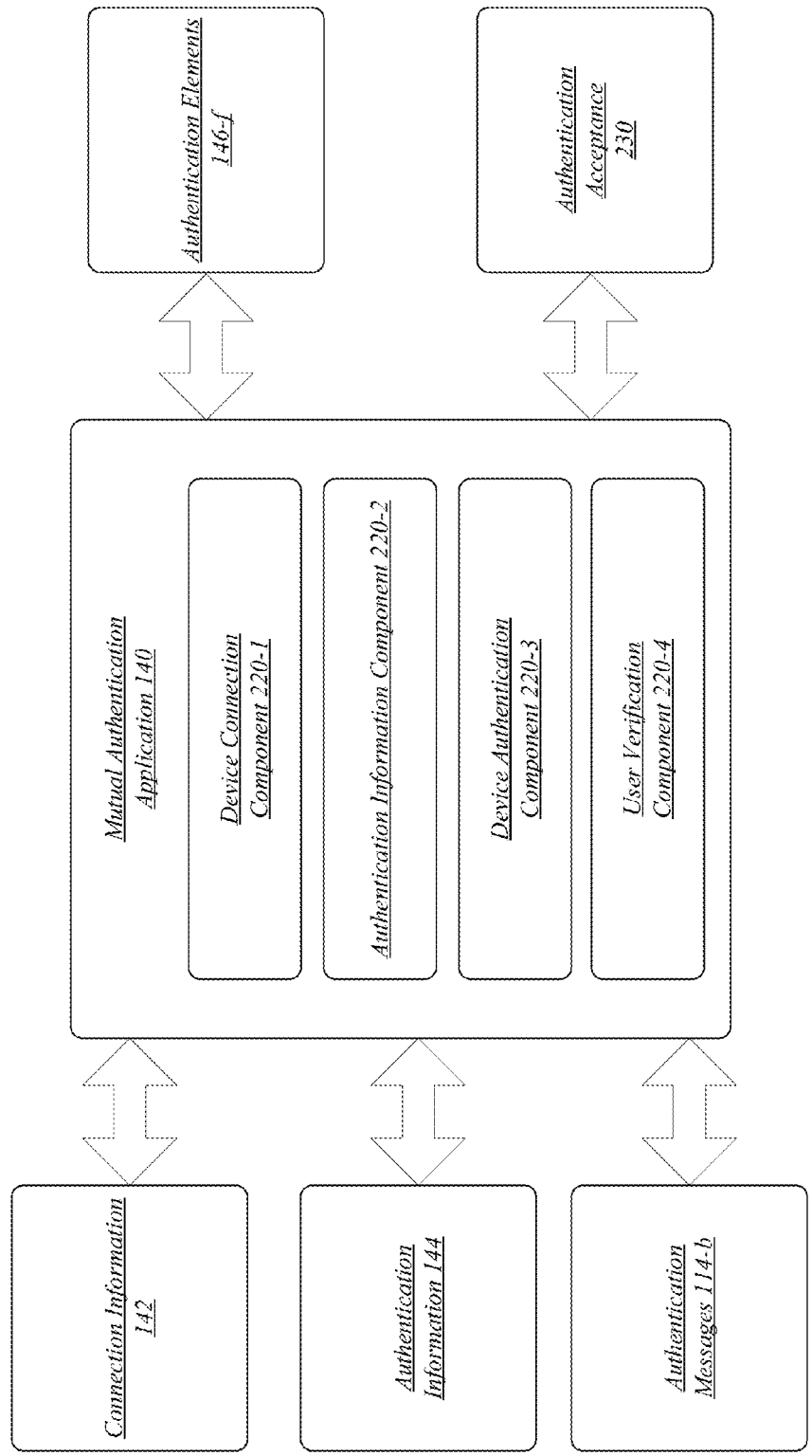
FIG. 2 illustrates an embodiment of a first operating environment for a mutual authentication application.

FIG. 2 illustrates an embodiment of an operating environment 200 for the close-range mutual authentication system 100. More particularly, the operating environment 200 may illustrate a more detailed block diagram for the mutual authentication application 140.

As shown in FIG. 2, the mutual authentication application 140 may comprise various components 220-g. As used in this application, the term "component" is intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In the illustrated embodiment shown in FIG. 2, the mutual authentication application 140 may comprise a device connection component 220-1, an authentication information component 220-2, a device authentication component 220-3, and a user verification component 220-4. Although the mutual authentication application 140 shown in FIG. 2 has only four components in a certain topology, it may be appreciated that the mutual authentication application 140 may include more or less components in alternate topologies as desired for a given implementation. The embodiments are not limited in this context.

The device connection component 220-1 may generally encode connection information on the server mode electronic device 120-1 and decode connection information 142 on the client mode electronic device 120-2. According to certain embodiments, the device connection component 220-1 may generally operate to encode connection information 142 in a manner that the encoded connection information 142 may only be accessible to an electronic device 120-2 in close range with the electronic device 120-1. For instance, the device connection component 220-1 may encode connection information 142 at the electronic device 120-1 for presentation on the display 170-1. In one embodiment, for example, the device connection component 220-1 may encode the connection information as a QR code presented on the display 170-1. The electronic device 120-2 may access the QR code when it is proximate to the electronic device such that a close-range input/output device 160-c accessible by the electronic device 120-2 may access the QR code, such as a QR code reader in the form of a camera.

In another embodiment, the device connection component 220-1 may encode the connection information 142 and transfer the encoded connection information 142 to a NFC writer. The electronic device 120-2 may access the encoded connection information 142 via a close-range input/output device 160-c configured to communicate with a NFC writer, such as a NFC reader.

The device connection component 220-1 may operate with various connection information elements, including, without limitation, transmission control protocol TCP port numbers, Internet protocol (IP) addresses, media access control (MAC) addresses, serial numbers, hash values, and combinations thereof. In one embodiment, the device connection component 220-1 operates to generate connection information 142 configured from multiple elements, such as a hash value, an IP address, and a TCP port number. For example, the device connection component 220-1 may encode the hash value, IP address, and TCP port number into a QR code for presentation on the display 170-1 of the server mode electronic device 120-1. In one embodiment, the hash value may be obtained from applying a hash function on a random number generated at the electronic device 120-a and a digital certificate associated with the electronic device 120-a. The client mode electronic device 120-2 may access the encoded connection information 142 and the device connection component 220-1 may operate to decode the connection information 142 into its constituent elements. The device connection component 220-1 may operate to establish a connection between the electronic devices 120-1, 120-2 utilizing the decoded connection information 142. For example, the device connection component 220-1 may communicatively connect electronic device 120-1 to electronic device 120-2 using the IP address and TCP port number information included in the connection information 142.

The authentication information component 220-2 may generally manage authentication information 144 between server mode and client mode devices (e.g., electronic devices 120-1, 120-2) for the mutual authentication application 140. The authentication information component 220-2 may coordinate the generation of authentication information 144 and messaging between the server mode and client mode devices 120-1, 120-2. The messaging between server mode and client mode devices 120-1, 120-2 may operate to exchange the authentication information between the server mode and client mode devices 120-1, 120-2, for example, utilizing one or more authentication messages 114-b. The authentication information component 220-2 may generate and operate with various forms of authentication information 144. Non-limiting examples of authentication information include random numbers, device identifiers, public/private key pairs, session keys (e.g., random session key), certificates (e.g., self-signed digital certificates such as an X.509 certificate), digital signatures, pseudorandom function (prf) values, human-readable information (e.g., word lists, pictures, etc.), and combinations and hash values thereof. Embodiments are not limited in this context.

In one embodiment, responsive to the client mode electronic device 120-2 establishing a connection with the server mode electronic device 120-1, the authentication information component 220-2 may send an authentication message 114-b from the client mode electronic device 120-2 to the server mode electronic device 120-2. For example, the authentication message 114-b may be a start-secure-pairing message comprising certain elements of authentication information 144. For instance, the start-secure-pairing message may include a random number, an encryption key, a signature, and a certificate associated with the client mode electronic device 120-2. The server mode electronic device 120-2 may receive the authentication message 114-b and the authentication information component 220-2 may operate to decode, derive, extract, or otherwise obtain authentication information 142 contained within the authentication message 114-b. Illustrative and non-restrictive examples of authentication message 114-b include accept-secure-pairing and confirm-secure-pairing messages. Authentication information 144 and the exchange of authentication message 114-b are described in more detail with respect to FIG. 4.

The device authentication component 220-3 may generally manage the authentication of electronic devices 120-a for the mutual authentication application 140. For instance, the device authentication component 220-3 may utilize the authentication information 144 and the authentication messages 114-b to authenticate the identity of an electronic device 120-a. For example, the device authentication component 220-3 may operate to determine the type of authentication message 114-b and to ensure that it is of an expected type. As described above, the authentication information component 220-2 may operate to send a start-secure-pairing authentication message 114-b from the client mode electronic device 120-2 to the server mode electronic device 120-1 responsive to a connection being established between the devices 120-1, 120-2. The device authentication component 220-3 may determine whether an authentication message 114-b is valid. For example, if the device authentication component 220-3 receives another message type (e.g., an accept-secure-pairing authentication message 114-b) when the device authentication component 220-3 is expecting a start-secure-pairing message, the device authentication component may determine that the authentication message 114-b is invalid. According to certain embodiments, if the message is not valid, it may be discarded. In another example, if an authentication message 114-b comprises authentication information 142 that the device authentication component 220-3 cannot validate (e.g., a signature of a self-signed certificate does not verify), then the authentication message 114-b may be discarded. If the authentication message 114-b and the authentication information 142 contained therein are authenticated by the device authentication component 220-3, then the server mode electronic device 120-1 may be authenticated to the client mode electronic device 120-2.

The user verification component 220-4 may generally manage the authentication of electronic devices 120-a utilizing authentication elements 146-f. For example, the user verification component 220-4 may generate one or more authentication elements 146-f for presentation on a display 170-c, such as display 170-1 and display 170-2. A user may read or view the authentication elements 146-f from display 170-2 to determine whether one or more of the authentication elements 146-f match one or more authentication elements 146-f presented on display 170-1. If there is a match, a user may indicate through the user verification component an authentication acceptance 230. For instance, in response to an authentication acceptance 230, a user may make an input selection at an electronic device 120-a indicating that the authentication of one of the electronic devices 120-a.

According to certain embodiments, the user verification component 220-4 may generate the authentication elements 146-f responsive to a user command or an authentication event, such as the server mode electronic device 120-1 being authenticated to the client mode electronic device 120-2. In this manner, the client mode electronic device 120-2 may be mutually authenticated to the server mode electronic device 120-1 through an out-of-band channel consisting of a visual comparison of authentication elements 146-f being presented on displays 170-1 and 170-2. The authentication elements 146-f may comprise various human-readable words, symbols, pictures, graphics, or combinations thereof. For example, the authentication elements 146-f may comprise one or more word lists, wherein device users may read the word lists presented on displays 170-1 and 170-2 to determine whether a threshold number of authentication elements 146-f match between those presented on display 170-1 and those displayed on 170-2.

Figure 3:
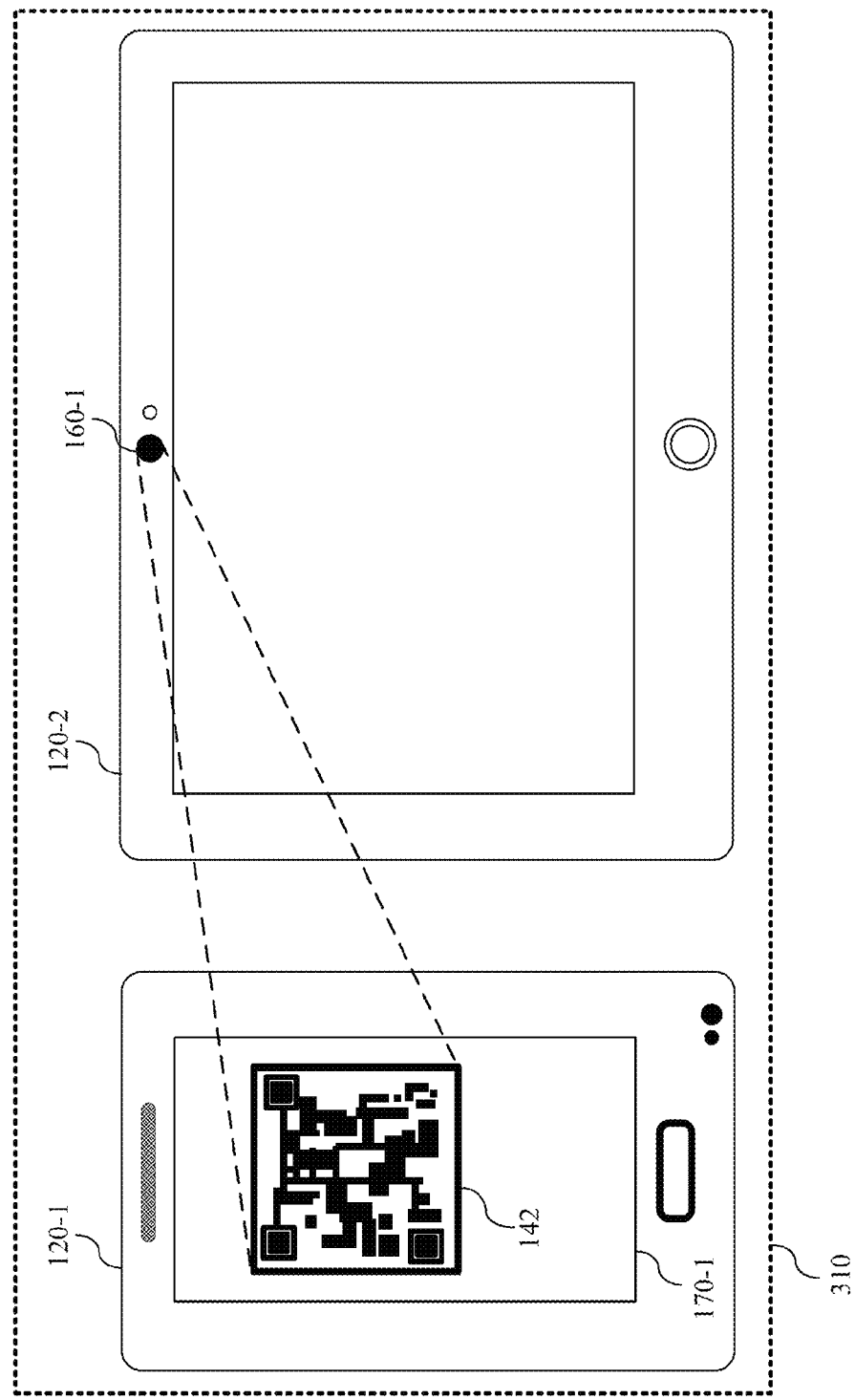
FIG. 3 illustrates an embodiment of a second operating environment for a mutual authentication application.

FIG. 3 illustrates an embodiment of an operating environment 300 for the close-range mutual authentication system 100. More particularly, the operating environment 300 may illustrate the presentation of connection information 142 of a server mode electronic device 120-1.

In the illustrated embodiment shown in FIG. 3, the server mode electronic device 120-1 and the client mode electronic device 120-2 may initiate the mutual authentication application 140 when they are within close-range 310 of each other. According to certain embodiments, a close-range 310 may involve the devices being within a certain distance of each other such that the close-range input/output devices 160-c may access information from a particular electronic device 120-a. In the embodiment of FIG. 3, the connection information 142 is presented in the form of a QR code on the display 170-1 of the server mode electronic device 120-1, which in this case, is a smartphone device. The client mode electronic device 120-2, which in this case is a tablet computing device, may access the connection information 142 utilizing a camera 160-1 accessible from the client mode electronic device 120-2.

Figure 4:
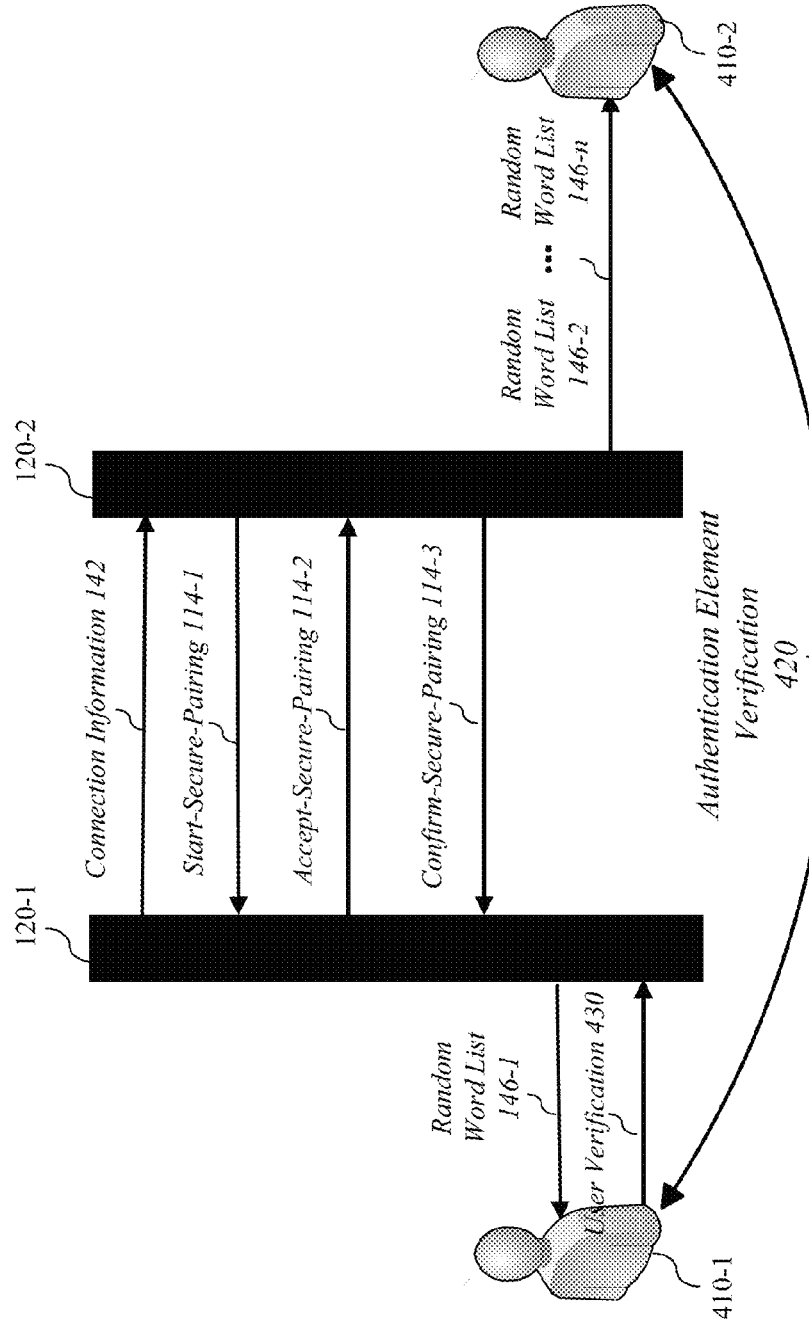
FIG. 4 illustrates an embodiment of an information flow for a mutual authentication application.

FIG. 4 illustrates an embodiment of an information flow 400. The information flow 400 as shown in FIG. 4 represents an exemplary flow of information between a server mode electronic device 120-1 and a client mode electronic device 120-2 during authentication.

As shown in FIG. 4, a server mode electronic device 120-1 and a client mode electronic device 120-2 are arranged within close-range 310 such that the client mode electronic device 120-2 may access the connection information 142 presented by the server mode electronic device 120-2 utilizing a close-range input/output device 160-c. The connection information 142 may be generated by the server mode electronic device 120-2 to include various forms of information. For example, the server mode electronic device 120-2 may generate a random number r and a certificate $cert_{server}$ and may hash these values to produce a hash value $h \leftarrow hash(r\|cert_{server})$. The connection information 142 may be formed by encoding h and certain connection information, such as an IP address ip, and a TCP port number. In one embodiment, h, ip, and p may be encoded according to the following: connection information $142 \leftarrow$ encode $(h\|ip\|p)$. The encoded connection information 142 may be made available from the server mode electronic device 120-2, for example, as a QR code, bar code, picture, or any other form of information accessible by a close-range input/output device.

As described above, the client mode electronic device 120-2 may access the encoded connection information 142 utilizing a close-range input/output device 160-c. The device connection component 220-1 resident on the client mode electronic device 120-2 may decode the encoded connection information 142 into its component elements, such as h, ip, and p. In one embodiment, the device connection component 220-1 may generate additional values on the encoded connection information 142, such as a hash of the encoded connection information: $h' \leftarrow hash(encoded\ connection\ information\ 142)$.

The device connection component 220-1 may use information contained within the connection information 142 to establish a connection between the client mode electronic device 120-2 and the server mode electronic device 120-1. For example, the client mode electronic device 120-2 may establish a TCP connection with the server mode electronic device 120-1 to port p at IP address ip. After the connection has been established, the authentication information component 220-2 may operate to generate certain authentication elements on the client mode electronic device 120-1. In one embodiment, the authentication elements may comprise one or more of the following: a random number r', a secret key $sk_{client}$, a public/private encrypt/decrypt key pair $ek_{client}/dk_{client}$, signature $sig_1 \leftarrow sign(sk_{client}, r'\|ek_{client})$, and a public key $vk_{client}$. The authentication information component 220-2 may operate to send a start-secure-pairing authentication message 114-1 from the client mode electronic device 120-2 to the server mode electronic device 120-1. The start-secure-pairing authentication message 114-1 may comprise various authentication information 144 elements. In one embodiment, the start-secure-pairing authentication messages 114-1 may include r', $ek_{client}$, $sig_1$, and self-signed certificate $cert_{client}$ authentication information 144 elements.

The mutual authentication application 140 operating on the server mode electronic device 120-1 may receive the start-secure-pairing authentication message 114-1. In one embodiment, the device authentication component 220-3 may determine whether the authentication message 114-1 received at this stage of authentication is valid. For example, if the authentication message 114-1 is not a start-secure-pairing message, the authentication message 114-1 may be deemed invalid and discarded. In another embodiment, the device authentication component 220-3 may validate one or more authentication information 144 elements contained in the authentication message 114-1. For instance, the device authentication component 220-3 may determine whether the self-signed certificate $cert_{client}$ may be verified, or whether $sig_1$ verifies using public key $vk_{client}$ over the data $r'\|ek_{client}$.

If the authentication information 144 included in the start-secure-pairing authentication message 114-1 cannot be verified, the authentication message 114-1 may be discarded by the mutual authentication application 140 operating on the server mode electronic device 120-1.

Embodiments provide that one or more information elements may be extracted from any authentication information 144 included in an authentication message 114-b, such as the start-secure-pairing authentication message 114-1. For example, responsive to receiving a valid start-secure-pairing authentication message 114-1 at the server mode electronic device 120-1, the authentication information component 220-2 resident on the server mode electronic device 120-1 may extract identification information from the $cert_{client}$ element, such as a client mode electronic device 120-1 identifier $id_{client}$ contained with $cert_{client}$. The authentication information component 220-2 may generate an accept-secure-pairing authentication message 114-2 at the server mode electronic device 120-1. Authentication information 144 may be generated at the server mode electronic device 120-1 for inclusion in one or more authentication messages 114-b, such as the accept-secure-pairing authentication message 114-2. Illustrative and non-restrictive examples of such authentication information 144 include a random session key k, public key $vk_{client}$, an encryption value $\alpha$ generated by encrypting $id_{client}\|k\|h$ under $ek_{client}$ (e.g., $\alpha \leftarrow$ Encrypt $(ek_{client}, id_{client}\|k\|h)$), a server mode electronic device 120-1 secret key $sk_{server}$, a server mode electronic device 120-1 identifier $id_{server}$, a signature $sig_2 \leftarrow sign(sk_{server}, r'\|r\|id_{server}\|\alpha)$, and combinations thereof. In one embodiment, the accept-secure-pairing authentication message 114-2 may be transmitted from the server mode electronic device 120-1 to the client mode electronic device 120-2 over the connection established via the device connection component 220-1, such as a TCP connection. The accept-secure-pairing authentication message 114-2 may be configured to transmit authentication information from the server mode electronic device 120-1 to the client mode device, including, without limitation, r', r, $\alpha$, $sig_2$, and $cert_{server}$.

The mutual authentication application 140 operative on the client mode electronic device 120-1 may receive the accept-secure-pairing authentication message 114-2 and the device authentication component 220-3 may validate the message 114-2 and authentication information 144 contained therein. For example, if the authentication message 114-2 is not an accept-secure-pairing authentication message 114-2, then the authentication message 114-2 may be discarded. According to certain embodiments, the authentication component 220-3 may operate to verify authentication information 144 included in the accept-secure-pairing authentication message 114-2. Non-limiting examples of authentication information 144 verification include the following: whether r' from the accept-secure-pairing authentication message 114-2 matches the r' value sent in the start-secure-pairing authentication message 114-1; whether the signature of the self-signed certificate $cert_{server}$ verifies; whether $sig_2$ verifies using $vk_{client}$ over the data $r'\|r\|id_{server}\|\alpha$; and combinations thereof.

In one embodiment, the authentication information component 220-2 operates to extract or recover certain authentication information 144 elements based on authentication information 144 included in the accept-secure-pairing authentication message 114-2. For instance, the authentication information component 220-2 may decrypt $\alpha$ utilizing $dk_{client}$ to recover $id_{client}\|k\|h"$ (e.g., $id_{client}\|k\|h" \leftarrow$ Decrypt $(dk_{client}, a)$). The device authentication component 220-3 may verify the authentication information recovered from decrypting a utilizing $dk_{client}$. For example, if $id_{client}$ is not the device identity from $cert_{client}$, then the accept-secure-pairing authentication message 114-2 may be discarded. In another example, the accept-secure-pairing authentication message 114-2 may be discarded if $h" \neq h$, where h is the value recovered by decoding the device connection information 142, as described above, and if $h \neq hash(r\|cert_{server})$.

In one embodiment, if the device authentication component 220-3 operative on the client mode electronic device 120-1 determines that $h"=h$, then the device authentication component 220-3 authenticates the server mode electronic device 120-1 on the client mode electronic device 120-2. If the authentication information 144 is not verified, the accept-secure-pairing authentication message 114-2 may be discarded.

The mutual authentication application 140 may operate to confirm authentication between the server mode electronic device 120-1 and the client mode electronic device 120-2. Confirmation of device authentication may be initiated by the authentication information component 220-2 generating a confirm-secure-pairing authentication message 114-3 for transmission to the server mode electronic device 120-1. In one embodiment, the authentication information component 220-2 may operate to generate authentication information to be transmitted with the confirm-secure-pairing authentication message 114-3. For example, one or more pseudorandom function (prf) values or signatures may be generated as part of authentication confirmation, including, without limitation, the following values: $m \leftarrow prf(k, r'\|r\|cert_{client}\|cert_{server}\|1)$; $h_1 \leftarrow prf(k, r'\|r\|cert_{client}\|cert_{server}\|2)$; $ak \leftarrow prf(k, r'\|r\|cert_{client}\|cert_{server}\|3)$; $ek \leftarrow prf(k, r'\|r\|cert_{client}\|cert_{server}\|4)$; and $sig_3 \leftarrow sign(sk_{client}, r\|id_{client}\|m)$. In one embodiment, the authentication information component 220-3 may generate a confirm-secure-pairing authentication message 114-3 having authentication information 144 comprising r, $id_{client}$, m, and $sig_3$.

The confirm-secure-pairing authentication message 114-3 may be received at the server mode electronic device 120-1, wherein the device authentication component 220-3 operative on the server mode electronic device 120-1 may verify the authentication message 114-3. For example, if the authentication message 114-3 is not a confirm-secure-pairing authentication message 114-3, the authentication message 114-3 may be discarded. The device authentication component 220-3 may operate on the server mode electronic device 120-1 to authenticate any authentication information 144 transmitted within the confirm-secure-pairing authentication message 114-3. For example, the device authentication component 220-3 may verify the following authentication information 144: whether r is the same r used to compute h; whether $id_{client}$ is the $id_{client}$ in $cert_{client}$; whether $sig_3$ verifies over $r\|id_{client}\|m$ using $vk_{client}$. In one embodiment, the authentication information component 220-2 may operate to calculate $m \leftarrow prf(k, r'\|r\|cert_{client}\|cert_{server}\|1)$ and the device authentication component 220-3 may operate to verify that m'=m.

In one embodiment, if the confirm-secure-pairing authentication message 114-3 and the authentication information 144 contained therein are authenticated, the authentication information component 220-2 may operate to generate certain authentication information 144 elements. For instance, the authentication information component 220-2 may generate a session authentication key $ak \leftarrow prf(k, r\|r'\|cert_{client}\|cert_{server}\|3)$ and an encryption key $ek \leftarrow prf(k, r'\|r\|cert_{client}\|cert_{server}\|4)$ that may be used to secure the transfer of information between the server mode electronic device 120-1 and the client mode electronic device 120-2. In one embodiment, the authentication information component 220-2 may operate to generate authentication information 144 to generate a key $h_1$ utilized to create one or more authentication elements 146-f.

The mutual authentication application 140 operative on the server mode electronic device 120-1 and client mode electronic device 120-2 may initiate user verification of device authentication. At this stage of the authentication process, the server mode electronic device 120-1 may be authenticated to the client mode electronic device 120-2. The server mode electronic device 120-1 may only establish that it has established a session with the device that sent the start-secure-pairing authentication message 114-1, and not that it is actually the client mode electronic device 120-1. As such, embodiments provide for user verification of device authentication, including authentication of the client mode electronic device 120-1 at the server mode electronic device 120-2.

In one embodiment, the client mode electronic device 120-1 may generate one or more authentication elements 146-f utilizing $h_1$. For example, the user verification component 220-4 operative on the client mode device may generate one or more random word lists 146-2-146-n. Random word list 146-2 may be based on $h_1$ and the remaining word lists may be based on one or more randomly generated numbers as follows: random word list 146-2← Dictionary($h_1$), random word list 146-n← Dictionary($h_n$). In this example, the function Dictionary(x) may operate to generate a word list from a dictionary object accessible by the user verification component 220-4 based on the parameter x. The user verification component 220-4 may present the random word lists 146-2-146-n on the display 170-2 coupled to the client mode electronic device 120-2. In one embodiment, the random word lists 146-2-146-n may be shuffled, for example, to compel a user to read all of the random word lists 146-2-146-n. At the same time, the user verification component 220-4 operative on the server mode device may generate one or more corresponding authentication elements 146-f. For example, the user verification component 220-4 may generate a random word list 146-1← Dictionary($h_1'$) for presentation on display 170-1 coupled to server mode electronic device 120-1.

Server mode device user 410-1 and client mode device user 410-2 may each read the authentication elements 146-f presented on their respective displays 170-1, 170-2 to each other, which, in this case is random word lists 146-1, 146-2-146-n, for authentication element verification 420. If one of the authentication elements 146-f presented at the client mode electronic device 120-2 matches a authentication element 146-f presented on the server mode electronic device 120-1, then the client mode electronic device 120-2 may be authenticated to the server mode electronic device 120-1. Otherwise, the authentication may be rejected (e.g., cert$_{client}$ is a forgery). If the client mode electronic device 120-2 is authenticated at the server mode electronic device 120-2, the server mode device user 410-1 may indicate to the user verification component 220-4, for example, through an input gesture, that user verification 420 is successful. In this manner, the client mode electronic device 120-1 may be authenticated to the server mode electronic device 120-2 utilizing the user verification 420 out-of-band communications. Generating authentication elements 146-f, such as one or more human-readable random word lists, and having device users 410-1, 410-2 read them aloud to each other may operate to prove to the device users 410-1, 410-2 that their devices 120-1, 120-2 are communicating with an intended device.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
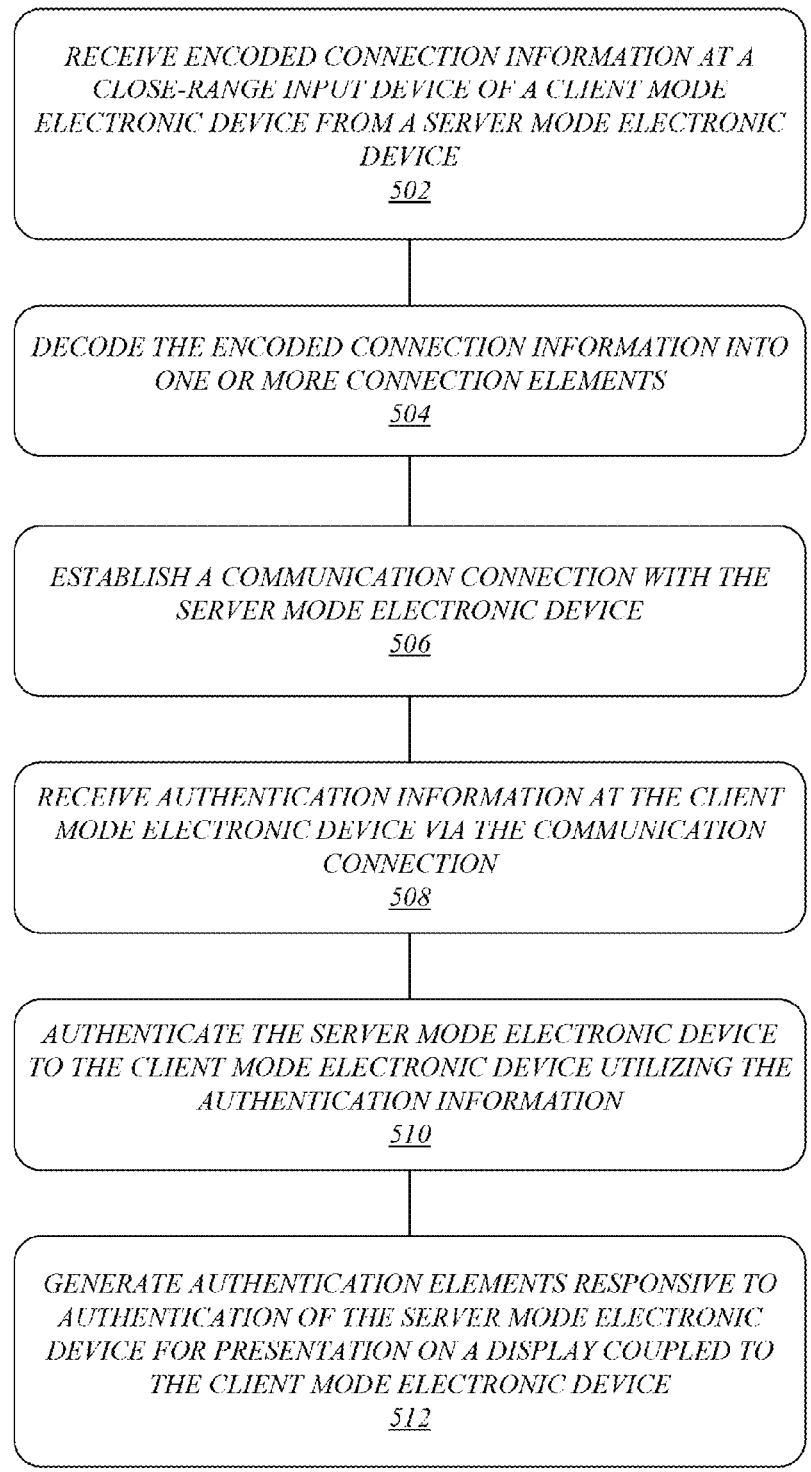
FIG. 5 illustrates an embodiment of a first logic flow.

FIG. 5 illustrates one embodiment of a logic flow 500. The logic flow 500 may be representative of some or all of the operations executed by one or more embodiments described herein. For example, the logic flow 500 may illustrate operations performed by the close-range mutual authentication system 100 and, more particularly, a client mode electronic device 120-2 of a close-range mutual authentication system 100.

In the illustrated embodiment shown in FIG. 5, the logic flow 500 may receive encoded connection information at a close-range input device of a client mode electronic device from a server mode electronic device at block 502. For example, the client mode electronic device 120-2 may be arranged in close-proximity 310 with the server mode electronic device 120-1 presenting encoded connection information 142, such as on a display or a NFC reader. A close-range input/output device 160-c coupled to the client mode electronic device 120-2 may access the connection information 142. In one embodiment, the connection information 142 may be encoded as a QR code which may be accessed by a camera close-range input/output device 160-c.

The logic flow 500 may decode the encoded connection information into one or more connection elements at block 504. For example, a device connection information component 220-1 may receive the encoded connection information 142 and may operate to decode the connection information into any component parts, such as an IP address and a TCP port number.

The logic flow 500 may establish a communication connection with the server mode electronic device at block 506. For example, the device connection component 220-1 operative on the client mode electronic device 120-2 may establish a connection utilizing the decoded connection information 142.

The logic flow 500 may receive authentication information at the client mode electronic device via the communication connection at block 508. For example, the client mode electronic device 120-2 may receive one or more authentication messages 114-b from the server mode electronic device 120-1. According to certain embodiments, the one or more authentication messages 114-b may comprise authentication information, such as a self-signed certificate of the sending device (e.g., server mode electronic device 120-1).

The logic flow 500 may authenticate the server mode electronic device to the client mode electronic device utilizing the authentication information at block 510. For example, the device authentication component 220-3 may operate to authenticate any authentication information 144 sent by the server mode electronic device 120-1. In this manner, the device authentication component 220-3 may verify the identity of the server mode electronic device 120-1 attempting to have secure communications with the client mode electronic device 120-2.

The logic flow 500 may generate authentication elements responsive to authentication of the server mode electronic device for presentation on a display of the client mode electronic device at block 512. For example, the user verification component 220-4 may operate to generate authentication elements 146-f, such as one or more word lists, for presentation on a display 170-1 coupled to the client mode electronic device 120-1.

FIG. 6 illustrates one embodiment of a logic flow 600. The logic flow 600 may be representative of some or all of the operations executed by one or more embodiments described herein. For example, the logic flow 600 may illustrate operations performed by the close-range mutual authentication system 100 and, more particularly, a server mode electronic device 120-1 of a close-range mutual authentication system 100.

In the illustrated embodiment shown in FIG. 6, the logic flow 600 may generate encoded connection information at a close-range output device of a server mode electronic device at block 602. For example, the device connection component 220-1 operating on the server mode electronic device 120-1 may generate connection information 142 comprising, inter alia, information for an electronic device 120-a to establish a connection with the server mode electronic device 120-1. The device connection component 220-1 may encode the connection information 142, for example, as a QR code, and present the encoded connection information 142 on a close-range input/output device 160-c, such as a display 170-1 or a NFC writer.

The logic flow 600 may transmit authentication messages comprising authentication information associated with the server mode electronic device to a client mode electronic device at block 604. For example, the authentication information component 220-2 may operate to generate one or more authentication messages 114-b comprised of authentication information. The authentication messages 114-b may be transmitted to an electronic device 120-a having an established connection with the server mode electronic device 120-1.

The logic flow 600 may receive authentication messages confirming authentication of the server mode electronic device at the client mode electronic device at block 606. For example, the device authentication component 220-3 operative on the client mode electronic device 120-2 may authenticate the server mode electronic device 120-1 based on the authentication information 144 communicated in the one or more authentication messages 114-b. The server mode electronic device 120-1 may receive a confirmation authentication message 114-3 confirming authentication of the server mode electronic device 120-1 at the client mode electronic device 120-2.

The logic flow 600 may generate one or more authentication elements for presentation on a display of the server mode electronic device, the one or more authentication elements configured to authenticate the client mode electronic device to the server mode electronic device at block 608. For example, the user verification component 220-4 may generate authentication elements 146-f, including, without limitation, one or more human-readable word lists, graphics, or pictures. The authentication elements 146-f may be presented on a display 170-1 for access by a server mode electronic device user 410-1.

The logic flow 600 may authenticate the client mode electronic device to the server mode electronic device responsive to receiving verified authentication input indicating verification of the authentication elements at block 610. For example, a server mode electronic device user 410-1 and server mode electronic device user 410-2 may verify that at least one authentication elements 146-f presented at the server mode electronic device 120-1 matches at least one authentication elements 146-f presented at the client mode electronic device 120-2. In response to authentication elements 146-f verification, a user 410-1, 410-2 may communicate the verification to the electronic devices 120-1, 120-2 resulting in authentication of the client mode electronic device 120-2 at the server mode electronic device 120-2.

Figure 7:
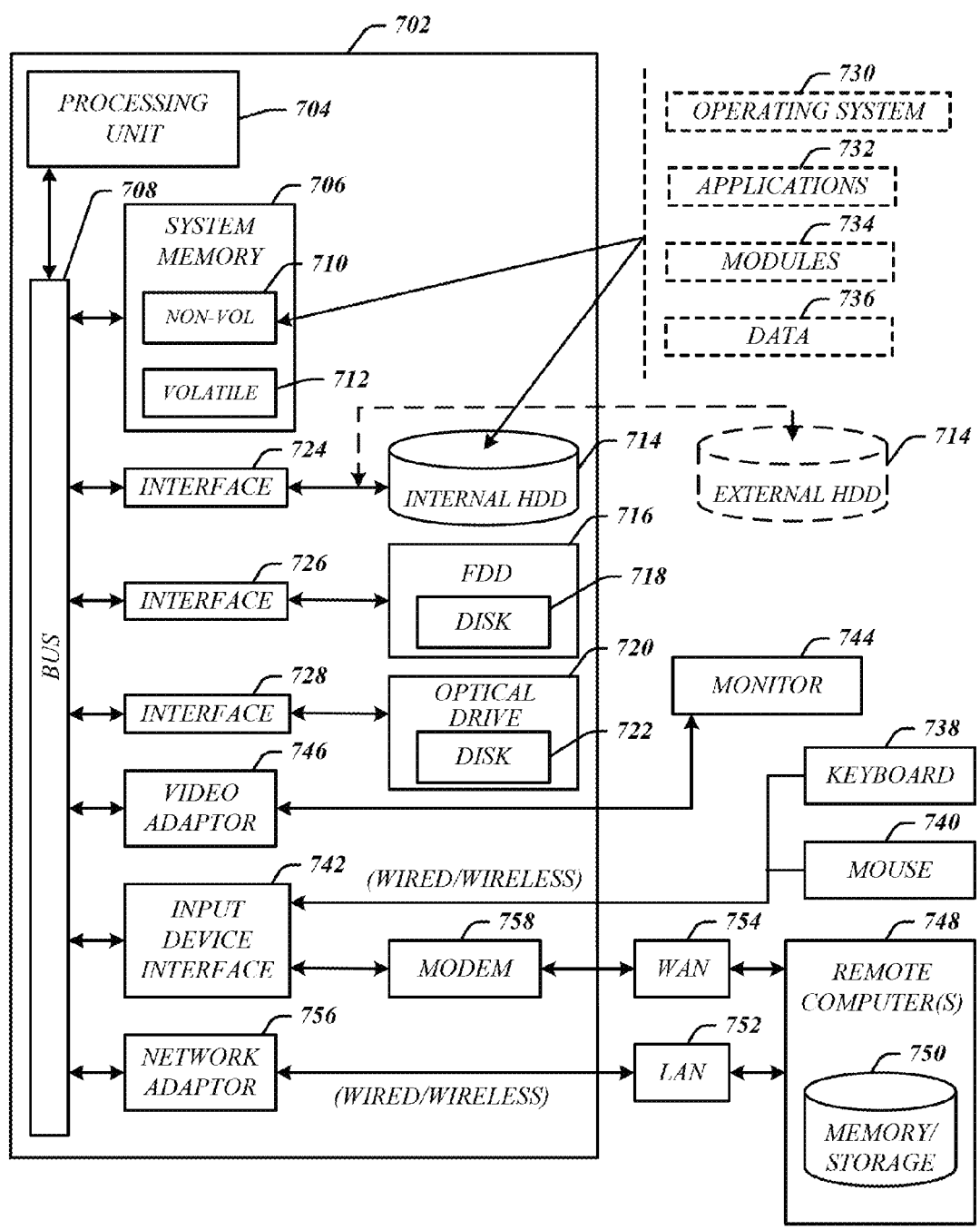
FIG. 7 illustrates an embodiment of a computing architecture.

FIG. 7 illustrates an embodiment of an exemplary computing architecture 700 suitable for implementing various embodiments as previously described. In one embodiment, the computing architecture 700 may comprise or be implemented as part of an electronic device 120-a.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, such as those described with reference to the processor circuit 130 shown in FIG. 1.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

The various elements of the close-range mutual authentication system 100 as previously described with reference to FIGS. 1-7 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments; examples one through thirty (1-30) provided below are intended to be exemplary and non-limiting.

In a first example, a computer-implemented method comprises: receiving encoded connection information at a close-range input device of a client mode electronic device from a server mode electronic device; decoding the encoded connection information into one or more connection elements; establishing a communication connection with the server mode electronic device utilizing the connection elements; receiving authentication information at the client mode electronic device via the communication connection; authenticating the server mode electronic device to the client mode electronic device utilizing the authentication information; and generating one or more authentication elements responsive to authentication of the server mode electronic device for presentation via a close-range output device of the client mode electronic device, the one or more authentication elements configured to confirm authentication of the client mode electronic device to the server mode electronic device.

A second example comprises the computer-implemented method of the first example, the encoded connection information comprising a quick response code.

A third example comprises the computer-implemented method of the second example, the close-range input device comprising at least one of a camera or a near field communication device.

A fourth example comprises the computer-implemented method of the first example, the close-range output device comprising a display device.

A fifth example comprises the computer-implemented method of the first example, the encoded connection information comprising an Internet protocol address and a transmission control protocol port number associated with the server mode electronic device.

A sixth example comprises the computer-implemented method of the first example, authenticating the server mode electronic device to the client mode electronic device utilizing the authentication information comprising receiving one or more authentication messages generated at the server mode electronic device, the one or more authentication messages comprising authentication information associated with the server mode electronic device.

A seventh example comprises the computer-implemented method of the sixth example, the authentication information associated with the server mode electronic device comprising a self-signed certificate identified in the encoded connection information.

An eighth example comprises the computer-implemented method of the first example, the one or more authentication elements comprising one or more word lists.

In a ninth example, an apparatus comprises a close-range input device; a close-range output device; a transceiver; a processor circuit communicatively coupled to the close-range input device, the close-range output device, and the transceiver; and a memory unit communicatively coupled to the processor circuit, the memory unit to store a mutual authentication application operative on the processor circuit to authenticate a server mode electronic device, the mutual authentication application comprising: a device connection component operative to receive encoded connection information from the server mode electronic device at the close-range input device, decode the connection information into one or more connection elements, and establish a communication connection with the server mode electronic device via the transceiver utilizing the one or more connection elements; an authentication information component operative to receive authentication information from the server mode electronic device via the communication connection; a device authentication component operative to authenticate the server mode electronic device utilizing the authentication information; and a user verification component operative to generate one or more authentication elements responsive to authentication of the server mode electronic device for presentation via the close-range output device, the one or more authentication elements configured to confirm authentication of the server mode electronic device.

A tenth example comprises the apparatus of the ninth example, the encoded connection information comprising a quick response code.

An eleventh example comprises the apparatus of the tenth example, the close-range input device comprising at least one of a camera or a near field communication device.

A twelfth example comprises the apparatus of the ninth example, the close-range output device comprising a display device.

A thirteenth example comprises the apparatus of the ninth example, the encoded connection information comprising an Internet protocol address and a transmission control protocol port number associated with the server mode electronic device.

A fourteenth example comprises the apparatus of the ninth example, device authentication component further operative to receive one or more authentication messages generated at the server mode electronic device, the one or more authentication messages comprising authentication information associated with the server mode electronic device.

A fifteenth example comprises the apparatus of the fourteenth example, the authentication information associated with the server mode electronic device comprising a self-signed certificate identified in the encoded connection information.

A sixteenth example comprises the apparatus of the ninth example, the one or more authentication elements comprising one or more word lists.

In a seventeenth example, at least one computer-readable storage medium comprises instructions that, when executed, cause a system to receive encoded connection information from a close-range input device of a client mode electronic device; decode the encoded connection information into one or more connection elements; establish a communication connection with a server mode electronic device utilizing the connection elements; receive authentication information at the client mode electronic device via the communication connection; authenticate the server mode electronic device to the client mode electronic device utilizing the authentication information; and generate one or more authentication elements responsive to authentication of the server mode electronic device for presentation via a close-range output device coupled to the client mode electronic device, the one or more authentication elements configured to authenticate the client mode electronic device to the server mode electronic device.

An eighteenth example comprises the computer-readable storage medium of the seventeenth example, the encoded connection information comprising a quick response code.

A nineteenth example comprises the computer-readable storage medium of the eighteenth example, the encoded connection information comprising a bar code.

A twentieth example comprises the computer-readable storage medium of the seventeenth example, the authentication information comprising a public-private encryption key pair.

A twenty-first example comprises the computer-readable storage medium of the seventeenth example, the encoded connection information comprising an Internet protocol address and a transmission control protocol port number associated with the server mode electronic device.

A twenty-second example comprises the computer-readable storage medium of the seventeenth example, comprising instructions that when executed cause the system to authenticate the server mode electronic device to the client mode electronic device utilizing the authentication information comprises receiving one or more authentication messages generated at the server mode electronic device, the one or more authentication messages comprising authentication information associated with the server mode electronic device.

A twenty-third example comprises the computer-readable storage medium of the twenty-second example, the authentication information associated with the server mode electronic device comprising a self-signed certificate identified in the encoded connection information.

An twenty-fourth example comprises the computer-readable storage medium of the seventeenth example, the one or more authentication elements comprising one or more word lists In a twenty-fifth example, a computer-implemented method comprises generating encoded connection information at a close-range output device of a server mode electronic device; transmitting one or more authentication messages comprising authentication information associated with the server mode electronic device to a client mode electronic device; receiving one or more authentication messages confirming authentication of the server mode electronic device at the client mode electronic device; generating one or more authentication elements for presentation on a display of the server mode electronic device, the one or more authentication elements configured to authenticate the client mode electronic device to the server mode electronic device; and authenticating the client mode electronic device to the server mode electronic device responsive to receiving verified authentication input indicating verification of the authentication elements.

A twenty-sixth example comprises the computer-implemented method of the eighteenth example, the encoded connection information comprising a quick response code.

A twenty-seventh example comprises the computer-implemented method of the eighteenth example, the close-range output device comprising at least one of a display device and a near field communication device.

A twenty-eighth example comprises the computer-implemented method of the eighteenth example, the encoded connection information comprising an Internet protocol address and a transmission control protocol port number associated with the server mode electronic device.

A twenty-ninth example comprises the computer-implemented method the eighteenth example, the authentication information associated with the server mode electronic device comprising a self-signed certificate.

A thirtieth example comprises the computer-implemented method of the eighteenth example, the one or more authentication elements comprising one or more word lists.

In some examples, an apparatus may comprise means for performing the method of any of the above-recited examples.

In various examples, at least one machine readable medium may comprise a plurality of instructions that in response to being executed on a computing device, cause the computing device to carry out a method according to any of the above-recited examples.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. At least one non-transitory computer-readable storage medium comprising instructions that, when executed, cause a system to:
receive encoded connection information encoded in a form accessible by a close-range input device of a client mode electronic device;
decode the encoded connection information into one or more connection elements;
establish a communication connection with a server mode electronic device utilizing the connection elements;
receive authentication information at the client mode electronic device from the server mode electronic device via the communication connection;
authenticate the server mode electronic device to the client mode electronic device utilizing the authentication information; and
generate one or more human-readable authentication elements responsive to authentication of the server mode electronic device for presentation via a display of the client mode electronic device and a display of the server mode electronic device, the one or more human-readable authentication elements configured to authenticate the client mode electronic device to the server mode electronic device.

2. The non-transitory computer-readable storage medium of claim 1, the encoded connection information comprising a quick response code.

3. The non-transitory computer-readable storage medium of claim 1, the encoded connection information comprising a bar code.

4. The non-transitory computer-readable storage medium of claim 1, the authentication information comprising a public-private encryption key pair.

5. The non-transitory computer-readable storage medium of claim 1, the encoded connection information comprising an Internet protocol address and a transmission control protocol port number associated with the server mode electronic device.

6. The non-transitory computer-readable storage medium of claim 1, comprising instructions that when executed cause the system to authenticate the server mode electronic device to the client mode electronic device utilizing the authentication information comprising receiving one or more authentication messages generated at the server mode electronic device, the one or more authentication messages comprising authentication information associated with the server mode electronic device.

7. The non-transitory computer-readable storage medium of claim 6, the authentication information associated with the server mode electronic device comprising a self-signed certificate identified by the encoded connection information.

8. The non-transitory computer-readable storage medium of claim 1, the one or more human-readable authentication elements comprising one or more word lists.

9. A computer-implemented method, comprising:
receiving encoded connection information encoded in a form accessible by a close-range input device of a client mode electronic device from a server mode electronic device;
decoding the encoded connection information into one or more connection elements;
establishing a communication connection with the server mode electronic device utilizing the connection elements;
receiving authentication information at the client mode electronic device from the server mode electronic device via the communication connection;
authenticating the server mode electronic device to the client mode electronic device utilizing the authentication information; and
generating one or more human-readable authentication elements responsive to authentication of the server mode electronic device for presentation via a display of the client mode electronic device and a display of the server mode electronic device, the one or more human-readable authentication elements configured to confirm authentication of the client mode electronic device to the server mode electronic device.

10. The computer-implemented method of claim 9, the encoded connection information comprising a quick response code.

11. The computer-implemented method of claim 10, the close-range input device comprising at least one of a camera or a near field communication device.

12. The computer-implemented method of claim 9, the encoded connection information comprising an Internet protocol address and a transmission control protocol port number associated with the server mode electronic device.

13. The computer-implemented method of claim 9, authenticating the server mode electronic device to the client mode electronic device utilizing the authentication information comprising receiving one or more authentication messages generated at the server mode electronic device, the one or more authentication messages comprising authentication information associated with the server mode electronic device.

14. The computer-implemented method of claim 13, the authentication information associated with the server mode electronic device comprising a self-signed certificate identified by the encoded connection information.

15. The computer-implemented method of claim 9, the one or more human-readable authentication elements comprising one or more word lists.

16. An apparatus, comprising:
a close-range input device;
a display device;
a transceiver;
a processor circuit communicatively coupled to the close-range input device, the close-range output device, and the transceiver; and
a memory unit communicatively coupled to the processor circuit, the memory unit to store a mutual authentication application operative on the processor circuit to authenticate a server mode electronic device, the mutual authentication application comprising:
 a device connection component operative to receive encoded connection information from the server mode electronic device in a form accessible by the close-range input device, decode the connection information into one or more connection elements, and establish a communication connection with the server mode electronic device via the transceiver utilizing the one or more connection elements;
 an authentication information component operative to receive authentication information from the server mode electronic device via the communication connection;
 a device authentication component operative to authenticate the server mode electronic device utilizing the authentication information; and
 a user verification component operative to generate one or more human-readable authentication elements responsive to authentication of the server mode electronic device for presentation via the display device, the one or more human-readable authentication elements configured to confirm authentication of the server mode electronic device.

17. The apparatus of claim 16, the encoded connection information comprising a quick response code.

18. The apparatus of claim 17, the close-range input device comprising at least one of a camera or a near field communication input device.

19. The apparatus of claim 17, the encoded connection information comprising an Internet protocol address and a transmission control protocol port number associated with the server mode electronic device.

20. The apparatus of claim 16, the device authentication component further operative to receive one or more authentication messages generated at the server mode electronic device, the one or more authentication messages comprising authentication information associated with the server mode electronic device.

21. The apparatus of claim 20, the authentication information associated with the server mode electronic device comprising a self-signed certificate identified in the encoded connection information.

22. The apparatus of claim 16, the one or more human-readable authentication elements comprising one or more word lists.

23. At least one non-transitory computer-readable storage medium comprising instructions that, when executed, cause a system to:
 generate encoded connection information at a close-range output device of a server mode electronic device, the encoded connection information being encoded in a form accessible by a close-range input device of a client mode electronic device;
 transmit one or more authentication messages comprising authentication information associated with the server mode electronic device to the client mode electronic device via a communication connection established utilizing the encoded connection information;
 receive one or more authentication messages confirming authentication of the server mode electronic device at the client mode electronic device;
 generate one or more human-readable authentication elements for presentation on a display of the server mode electronic device, the one or more human-readable authentication elements configured to authenticate the client mode electronic device to the server mode electronic device; and
 authenticate the client mode electronic device to the server mode electronic device responsive to receiving verified authentication input indicating verification of the one or more human-readable authentication elements.

24. The non-transitory computer-readable storage medium of claim 23, the encoded connection information comprising a quick response code.

25. The non-transitory computer-readable storage medium of claim 23, the close-range output device comprising at least one of a display device and a near field communication device.

26. The non-transitory computer-readable storage medium of claim 23, the encoded connection information comprising an Internet protocol address and a transmission control protocol port number associated with the server mode electronic device.

27. The non-transitory computer-readable storage medium of claim 23, the authentication information associated with the server mode electronic device comprising a self-signed certificate identified in the encoded connection information.

28. The non-transitory computer-readable storage medium of claim 23, the one or more human-readable authentication elements comprising one or more word lists.

* * * * *